United States Patent
Song et al.

(10) Patent No.: US 10,109,193 B2
(45) Date of Patent: Oct. 23, 2018

(54) SYSTEM AND METHOD FOR CONTROLLING SAFETY MESSAGE TRANSMISSION BETWEEN GROUP DRIVING VEHICLES

(71) Applicant: Electronics and Telecommunications Research Institute, Daejeon (KR)

(72) Inventors: Yoo Seung Song, Daejeon (KR); Hyun Jeong Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 312 days.

(21) Appl. No.: 15/050,694

(22) Filed: Feb. 23, 2016

(65) Prior Publication Data

US 2017/0193822 A1  Jul. 6, 2017

(30) Foreign Application Priority Data

Jan. 6, 2016  (KR) .......... 10-2016-0001453

(51) Int. Cl.
*G08G 1/00*  (2006.01)
*G08G 1/0967*  (2006.01)
(Continued)

(52) U.S. Cl.
CPC ....... *G08G 1/096791* (2013.01); *G08G 1/162* (2013.01); *G08G 1/163* (2013.01); *H04W 4/046* (2013.01); *H04W 4/12* (2013.01)

(58) Field of Classification Search
CPC ............................ G08G 1/00; H04W 4/00
See application file for complete search history.

(56) References Cited

U.S. PATENT DOCUMENTS

2008/0140287 A1  6/2008  Yang et al.
2013/0279393 A1*  10/2013  Rubin ................... H04J 3/1694
                                          370/312
(Continued)

FOREIGN PATENT DOCUMENTS

EP   2 276 012      1/2011
JP   2007-176355    7/2007

OTHER PUBLICATIONS

Marc Torrent-Moreno et al., "Vehicle-to-Vehicle Communication: Fair Transmit Power Control for Safety-Critical Information", IEEE Transaction on Vehicular Technology, vol. 58, No. 7., Sep. 2009, pp. 3684-3703.

*Primary Examiner* — Shirley Lu
(74) *Attorney, Agent, or Firm* — Kile Park Reed & Houtteman PLLC

(57) ABSTRACT

Disclosed is a technology for controlling safety message transmission between group driving vehicles. A system for controlling safety message transmission between group driving vehicles includes a setting unit configured to set a transmission time interval and a transmission power of a safety message, a message type determination unit configured to analyze a safety message received, and determine whether the safety message is a general safety message or an emergency safety message, a reception state determination unit configured to determine a reception state of the safety message transmitted from the message type determination unit, and a control unit configured to generate a new transmission time interval and a new transmission power for safety message transmission based on a value of the reception state determined by the reception state determination unit, and transmit the generated new transmission time interval and new transmission power to the setting unit.

17 Claims, 5 Drawing Sheets

(51) Int. Cl.
*H04W 4/04* (2009.01)
*H04W 4/12* (2009.01)
*G08G 1/16* (2006.01)

(56) References Cited

U.S. PATENT DOCUMENTS

2014/0092735 A1* 4/2014 Lee .................... H04W 28/0231
                                                              370/230
2017/0053530 A1* 2/2017 Gogic .................... H04W 4/046

* cited by examiner

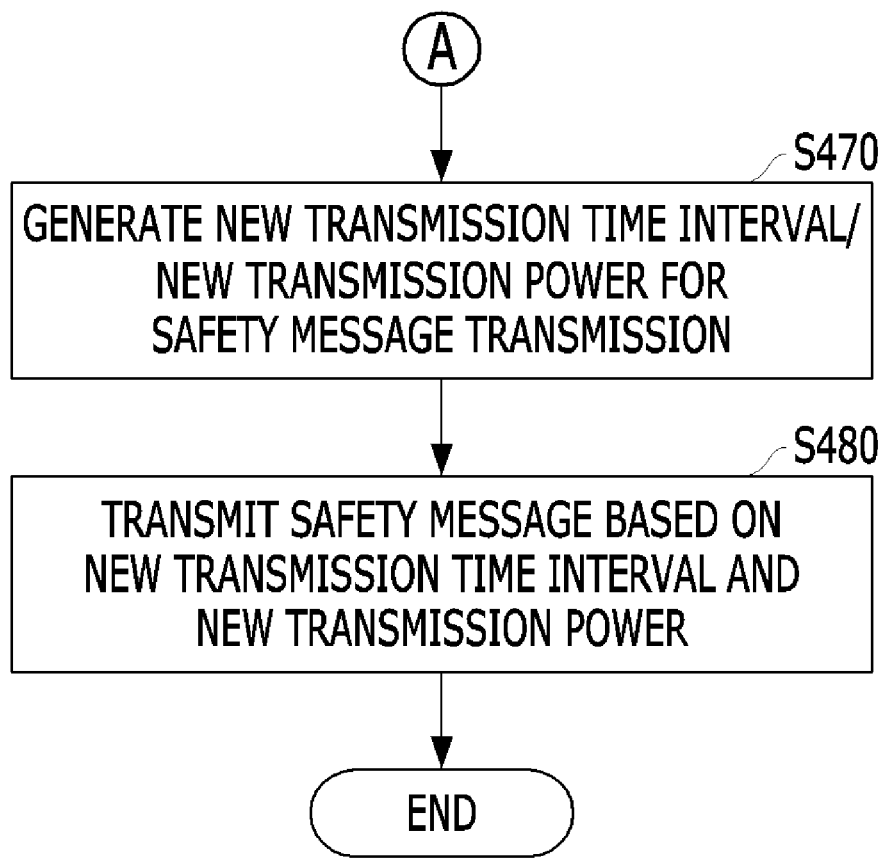

SYSTEM AND METHOD FOR CONTROLLING SAFETY MESSAGE TRANSMISSION BETWEEN GROUP DRIVING VEHICLES

CROSS-REFERENCE TO RELATED APPLICATION

This application claims priority to and the benefit of Korean Patent Application No. 2016-0001453, filed on Jan. 6, 2016, the disclosure of which is incorporated herein by reference in its entirety.

BACKGROUND

1. Field of the Invention

The present invention relates to a technology for controlling safety message transmission between group driving vehicles, and more particularly, to a system and a method for controlling safety message transmission between group driving vehicles capable of ensuring the reliability of emergency safety message transmission/reception as a vehicle having received an emergency safety message transmits a general safety message based on adjusted transmission power and adjusted transmission time interval.

2. Discussion of Related Art

Recently, studies on smart vehicles have progressed in various aspects, and methods for improving road efficiency and fuel efficiency together with smart vehicles capable of performing unmanned autonomous driving are also being studied.

Rapid development of smart transportation systems is accelerating as infrastructure technology such as various kinds of sensors and communication devices applied to vehicles starts to be developed in complement thereto and integrated.

Smart vehicles in which various sensors and wireless communication functions are installed to recognize a situation and prevent traffic accidents or provide a variety of transportation information and data services to a driver have several features.

First, in smart vehicles, a plurality of vehicle sensors (Rada, light detection and ranging (Lidar), cameras, etc.) are installed, and convenience and safety functions for drivers are provided by recognizing distances between vehicles, lanes, etc.

Further, since smart vehicles support various wireless communication protocols (Long Term Evolution (LTE), WAVE, wireless fidelity (Wi-Fi), Bluetooth (BT), etc.), network services are able to be provided anywhere and at any time.

Moreover, such smart vehicles support gateway and routing functions supporting different types of wireless data transmission and reception, support single autonomous driving and group driving functions, and transmit and receive various safety messages.

Technology for increasing road efficiency per unit area and improving fuel efficiency of vehicles through group driving in which a plurality of vehicles are driven collectively using smart vehicles is being studied.

Currently, group driving technology is technology in which a plurality of vehicles are driven while maintaining intervals of several meters from leading vehicles, and the group driving technology is receiving great attention as a solution capable of improving road efficiency and fuel efficiency.

Important technology needed for group driving technology is technology related to sensors such as radar sensors measuring distances between vehicles and wireless communication for sharing driving information between vehicles.

That is, group driving technology could also be seen as cooperative adaptive cruise control (ACC) driving in which a plurality of vehicles emulate driving of a leader vehicle by utilizing driving information of the leader vehicle in a conventional ACC function.

In this case, one of the vehicles performing the group driving drives as the leader vehicle, and there are one or more subordinate vehicles that drive subordinately to the leader vehicle behind the leader vehicle. The leader vehicle broadcasts its own vehicle status information to the subordinate vehicles as a periodical safety message, and the subordinate vehicles receiving the information drive along a driving path at constant intervals with reference to the driving information of the leader vehicle.

Messages transmitted and received through wireless communication devices installed in smart vehicles are largely classified as service data for vehicle infotainment, safety messages informing of periodical vehicle driving status information or an emergency status, and other control/management messages, etc. The general data services use a service channel, and the data related to vehicle safety and control/management, etc., uses a control channel that all vehicles use in common.

The safety messages are largely classified as safety messages ("general safety messages") in which a vehicle transmits its own status information at a constant period, and messages ("emergency safety messages") transmitted when a specific event occurs, and for example, the safety messages include a vehicle anti-collision support safety message, a road work zone alarm safety message, an emergency vehicle approach warning safety message, a road danger zone alarm safety message, an emergency rescue recovery alarm safety message, and an emergency disaster alarm safety message, etc.

Accordingly, since emergency safety messages such as emergency rescue recovery/disaster alarm safety messages have to be rapidly and reliably transmitted to nearby vehicles, reliability is required when transmitting and receiving emergency safety messages in an environment in which general safety messages are transmitted and received.

Accordingly, studies on transmission intensity and transmission periods, etc. of safety messages are progressing to enable stable and effective communications between vehicles driven in groups. Methods of controlling radio field intensity of a vehicle communication device that have been studied so far include a method of controlling radio field intensity based on a maximum/broadcasting message loading value, a method of controlling radio field intensity based on an occupancy rate of a wireless channel, and a method of controlling radio field intensity based on the number of target vehicles, etc. based on a radio field reception sensitivity ratio.

However, in current vehicle ad-hoc network (VANET) environments, studies related to radio field intensity control of vehicle communication devices have focused on methods of controlling the radio field intensity needed to control a data flow of an effective network when periodical messages are transmitted.

However, reliable transmission and reception of emergency safety messages such as disaster messages in an environment in which periodical messages are transmitted and received is not guaranteed. Particularly, the transmission and reception of periodical safety messages frequently occurs between vehicles driven in a group, and a solution is required because the transmission and reception of the periodical safety messages acts as an interference signal and obstructs the transmission and reception of emergency safety messages of not only the vehicle itself but also other nearby vehicles.

SUMMARY OF THE INVENTION

The present invention is directed to technology for a system and a method for controlling safety message transmission between group driving vehicles capable of ensuring the reliability of emergency safety message transmission/reception as a vehicle having received an emergency safety message transmits a general safety message based on adjusted transmission power and transmission time interval.

The technical objectives of the inventive concept are not limited to the above invention; other objectives may become apparent to those of ordinary skill in the art based on the following descriptions.

In accordance with one aspect of the present invention, there is provided a system for controlling safety message transmission between group driving vehicles, the system including a setting unit, a message type determination unit, a reception state determination unit, and a control unit. The setting unit may be configured to set a transmission time interval and a transmission power of a safety message. The message type determination unit may be configured to analyze a safety message received, and determine whether the safety message is a general safety message or an emergency safety message. The reception state determination unit may be configured to determine a reception state of the safety message transmitted from the message type determination unit. The control unit may be configured to generate a new transmission time interval and a new transmission power for safety message transmission based on a value of the reception state determined by the reception state determination unit, and transmit the generated new transmission time interval and new transmission power to the setting unit.

In accordance with another aspect of the present invention, there is provided a method for controlling safety message transmission between group driving vehicles, the method including: receiving a safety message transmitted from outside; determining whether the received safety message is a general safety message or an emergency safety message by analyzing the received safety message; determining a reception state of the received safety message if it is determined that the received safety message is an emergency safety message as a result of the determining of whether the safety message is a general safety message or an emergency safety message; generating a new transmission time interval and a new transmission power for safety message transmission if it is determined that the reception state of the received safety message is not good as a result of the determining of the reception state; and transmitting a safety message based on the new transmission time interval and the new transmission power.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 4A and 4B are flowcharts showing an order according to operations of the system for controlling safety message transmission between group driving vehicles according to an exemplary embodiment of the present invention.

DETAILED DESCRIPTION OF EXEMPLARY EMBODIMENTS

Figure 1:
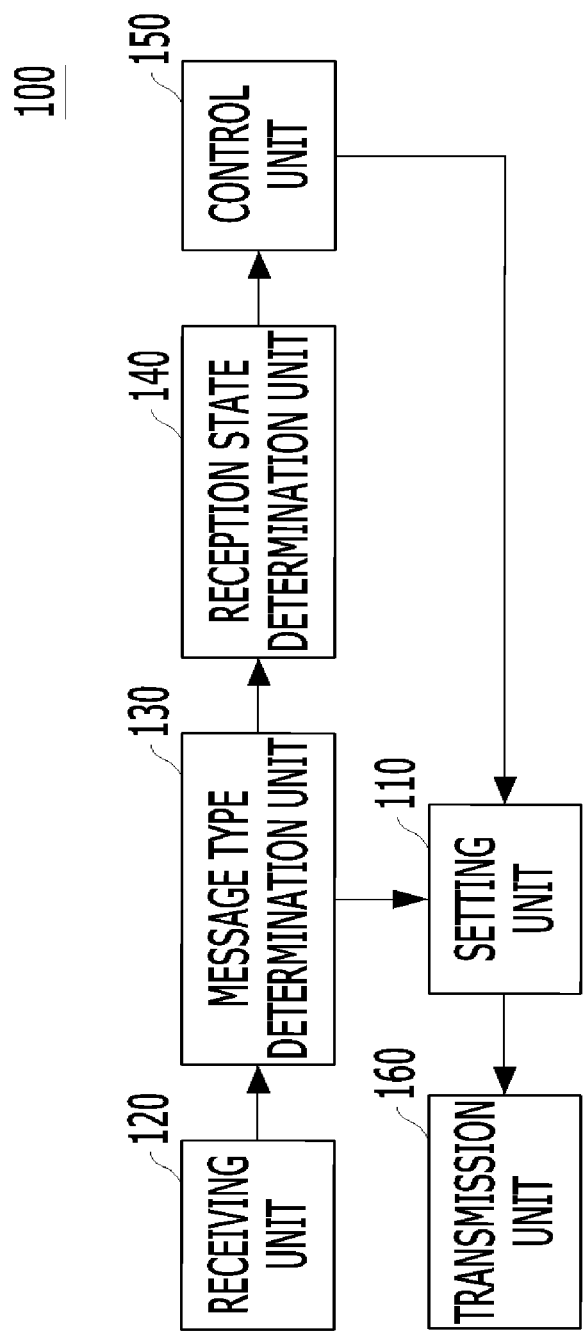
FIG. 1 is a block diagram illustrating an configuration of a system for controlling safety message transmission between group driving vehicles according to an exemplary embodiment of the present invention.

The above objects and other advantages, and a scheme for the advantages of the present invention will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention, and the present invention is defined only by the scope of the appended claims. Also, the same reference numerals are used to designate the same elements throughout the drawings.

In describing the present invention, detailed descriptions that are well-known but are likely to make the subject matter of the present invention unclear will be omitted in order to avoid redundancy. The terminology used herein is defined in consideration of its function in the present invention, and may vary with an intention of a user and an operator or custom. Accordingly, the definition of the terms should be determined based on overall contents of the specification.

Hereinafter, a method for controlling safety message transmission between group driving vehicles according to an exemplary embodiment of the present invention will be described with reference to the accompanying drawings.

The method of controlling safety message transmission between group driving vehicles according to an exemplary embodiment of the present invention, which will be described below, is realized by merging various technologies, including a technology of recognizing a characteristic of safety message broadcasting generated from surrounding infrastructure and vehicles and controlling a broadcasting time interval and a broadcasting power of periodic safety messages of group driving vehicles, a technology of adaptively designing an algorithm based on recognition of a network congestion state of group driving vehicles and nearby vehicles, a technology of dividing group driving vehicles into a leader vehicle and follower vehicles and controlling a safety message broadcasting differently between the leader vehicle and the follower vehicles, a technology of controlling a safety message broadcasting of follower vehicles without using an additional control channel for a safety message transmitted from a leader vehicle, and a technology of returning a control value to an initial state when an emergency safety message broadcasting is not detected during a certain time period by use of a timer.

FIG. 1 is a block diagram illustrating a configuration of a system for controlling safety message transmission between group driving vehicles according to an exemplary embodiment of the present invention.

Referring to FIG. 1, a system 100 for controlling safety message transmission between group driving vehicles according to an exemplary embodiment of the present invention (hereinafter, referred to as a 'system') is implemented to ensure the reliability and promptness of transmitting and receiving a safety message, in particular, an emergency safety message, between group driving vehicles.

In this case, the system 100 includes a setting unit 110, a receiving unit 120, a message type determination unit 130, a reception state determination unit 140, a control unit 150 and a transmission unit 160, and the elements of the system 100 are not limited thereto and an addition of other elements may be possible.

In detail, the setting unit 110 sets a power ('a transmission power') and a time interval ('a transmission time interval') for transmission of a safety message, and controls the transmission unit 160 based on the set transmission power and the set transmission time interval, so that the transmission unit 160 transmits a safety message to the outside (for example, to group driving vehicles) based on the transmission power and transmission time interval that are set by the setting unit 110.

In this case, the setting unit 110 may set a transmission power ('initial transmission power') and a transmission time interval ('initial transmission time interval ') of a safety message corresponding to when the system 100 starts being driven. The initial transmission power and the initial transmission time interval, related to transmission of a safety message, are previously set according to the system 100.

In this case, the setting unit 110 may set the initial transmission power of the safety message as a maximum value (Pmax) within a range of set transmission power, and set the initial transmission time interval of the safety message as a minimum value (Rmin) within a range of set transmission time interval.

That is, in the initiation stage of driving the system 100, the setting unit 110 may set a maximum value (Pmax) within a range of set transmission power as the initial transmission power, and set a minimum value (Rmin) within a range of set transmission time interval as the initial transmission time interval.

In addition, the setting unit 110, upon receiving an initialization signal transmitted from the message type determination unit 130, may set a current transmission power and a current transmission time interval related to a safety message as the initial transmission power and the initial transmission time interval.

In addition, the setting unit 110 receives a control value for a transmission power and a transmission time interval related to a safety message from the control unit 150, and sets a safety message transmission power and a safety message transmission time interval.

The receiving unit 120 receives a safety message transmitted from outside (for example, a base station or a nearby vehicle), and transmits the received safety message to the message type determination unit 130.

In this case, the receiving unit 120 is implemented to store the received safety message in a storage unit (not shown) of the system 100, and is maintained to receive a safety message.

The receiving unit 120 may be implemented in various forms depending on a communication protocol with which the system 100 communicates with outside, and detailed description of the receiving unit 120 is omitted.

The message type determination unit 130 receives a safety message transmitted from the receiving unit 120, analyzes the received safety message, and determines whether the received safety message is more important than safety messages that are periodically transmitted by group driving vehicles ('a general safety message').

That is, the message type determination unit 130 determines whether the received safety message is a general safety message or an emergency safety message by analyzing the received safety message.

In this case, if the received safety message is determined to be an emergency safety message, the message type determination unit 130 transmits the received safety message to the reception state determination unit 140.

On the other hand, if the received safety message is determined to be not an emergency safety message, the message type determination unit 130 waits for the next safety message to be input.

In addition, the message type determination unit 130 starts counting from the point of time when an emergency safety message is received, and if it is determined that a new emergency safety message is not received within a preset time period, sends the setting unit 110 a signal ('an initialization signal') to initialize the setting unit 110.

The reception state determination unit 140 receives the safety message transmitted from the message type determination unit 130, and determines a reception state of the safety message.

That is, the reception state determination unit 140 determines a reception state of a safety message, determined to be an emergency safety message in the message type determination unit 130, and according to the determination of the reception state, determines effectiveness of the received safety message.

According to the present discourse, it is determined whether to change a transmission power and a transmission time interval of a safety message, transmitted from a vehicle equipped with the system 100 to the outside, depending on the effectiveness of the safety message.

In this case, being effectiveness of a safety message represents that the received safety message is not significantly distorted or attenuated due to radio interference in the process of transmission, so that the contents of the safety message can be sufficiently identified by a receiving part.

In addition, not being effectiveness of a safety message represents that the received safety message is significantly distorted or attenuated due to radio interference in the process of transmission, so that the contents of the safety message cannot be clearly identified by a receiving part.

If it is determined that the reception state of the safety message is good (the safety message is effective) as a result of the determination of the reception state of the safety message, the reception state determination unit 140 waits for the next safety message to be received.

On the other hand, if it is determined that the reception state of the safety message is not good (the safety message is not effective) as a result of the determination of the reception state of the safety message, the reception state determination unit 140 sends the control unit 150 a value of the reception state, that is, a result of the determination on the reception state of the safety message.

The control unit 150 receives the reception state value transmitted from the reception state determination unit 140, and based on the received reception state value, generates a new transmission time interval and a new transmission power for a general safety message transmitted from the transmission unit 160, and transmits the generated new transmission time interval and new transmission power to the setting unit 110.

Then, the setting unit 110 controls the transmission unit 160 based on the new transmission time interval and the new transmission power transmitted from the control unit 150 so that the transmission unit 160 transmits a general safety message to the outside according to the new transmission power and the new transmission time interval.

The transmission unit 160 is configured to transmit a safety message to the outside, to transmit a safety message according to a transmission power and a transmission time interval that are set and transmitted by the setting unit 110.

The construction and functionalities of the system for controlling safety message transmission between group driving vehicles according to an exemplary embodiment of the present invention have been described above. Hereinafter, the operations of the message type determination unit 130, the reception state determination unit 140 and the control unit 150 of the system for controlling safety message transmission between group driving vehicles according to an exemplary embodiment of the present invention will be described in detail.

First, a method of determining the type of a safety message in the message type determination unit 130 will be described with reference to FIG. 2.

Figure 2:
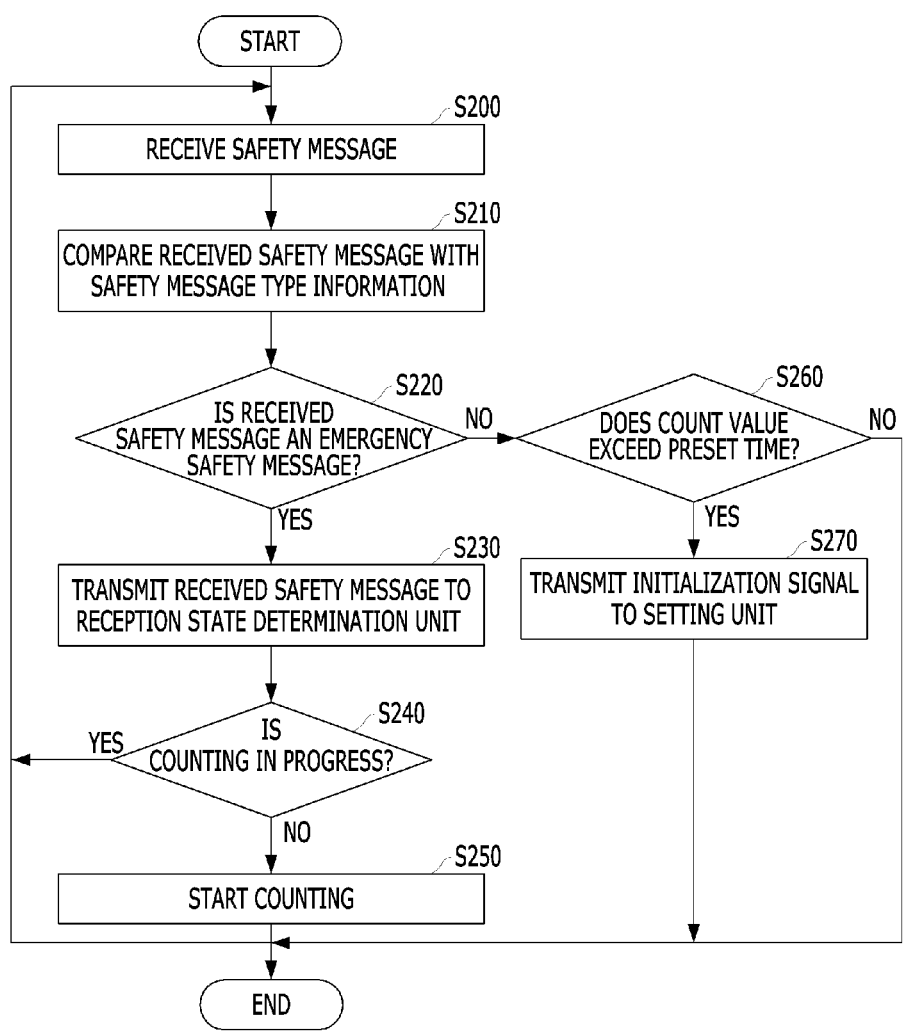
FIG. 2 is a flowchart showing an order according to operations of a message type determination unit of the system for controlling safety message transmission between group driving vehicles according to an exemplary embodiment of the present invention.

FIG. 2 is a flowchart showing an order according to operations of a message type determination unit of the system for controlling safety message transmission between group driving vehicles according to an exemplary embodiment of the present invention.

The message type determination unit 130 receives a safety message transmitted from the receiving unit 120 (S200), and determines whether the received safety message is a general safety message or an emergency safety message by analyzing the received safety message.

At this time, the message type determination unit 130 stores information about all types of safety messages transmitted and received between group driving vehicles (safety message type information), in which all the types of safety messages are divided into general safety messages and emergency safety messages.

Accordingly, the message type determination unit 130, upon receiving a safety message (S200), compares the received safety message with the safety message type information (S210) to determine whether the received safety message is a general safety message or an emergency safety message (S220).

For example, a vehicle collision warning safety message and a roadwork area notification safety message may be set as general safety messages, and an emergency vehicle access alert safety message, a dangerous road section notification safety message, an emergency rescue alert safety message, and a disaster alert safety message may be set as emergency safety messages, but the type and classification of the safety messages are not limited thereto.

If the received safety message is determined to be an emergency safety message as a result of the determining of the type of the safety message in operation S220(Yes from S220), the message type determination unit 130 transmits the received safety message to the reception state determination unit 140 (S230).

After transmitting the safety message to the reception state determination unit 140 according to operation 230, the message type determination unit 130 determines whether a counting is in progress (S240). If it is determined that a counting is in progress (Yes from S240), the message type determination unit 130 waits for the next safety message to be received, and if it is determined that a counting is not in progress (No from S240), the message type determination unit 130 starts counting (S250), and waits for the next safety message to be received.

If it is determined that the received safety message is not an emergency safety message as a result of the determining of the type of the safety message in operation S220 (No from S220), that is, if it is determined that the received safety message is a general safety message, the message type determination unit 130 checks a count value and determines whether the count value exceeds a preset time (S260).

If it is determined in operation S260 that the count value exceeds the preset time (Yes from S260), the message type determination unit 130 sends the setting unit 110 an initialization signal for initializing a transmission time interval and a transmission power of a safety message (S270), and waits for the next safety message to be received.

On the other hand, if it is determined in operation S260 that the count value does not exceed the preset time (No from S260), that is, the count value is equal to or less than the present time, the message type determination unit 130 waits for the next safety message to be received.

Hereinafter, a method of determining a reception state of a safety message in the reception state determination unit 140 will be described in detail with reference to FIG. 3.

Figure 3:
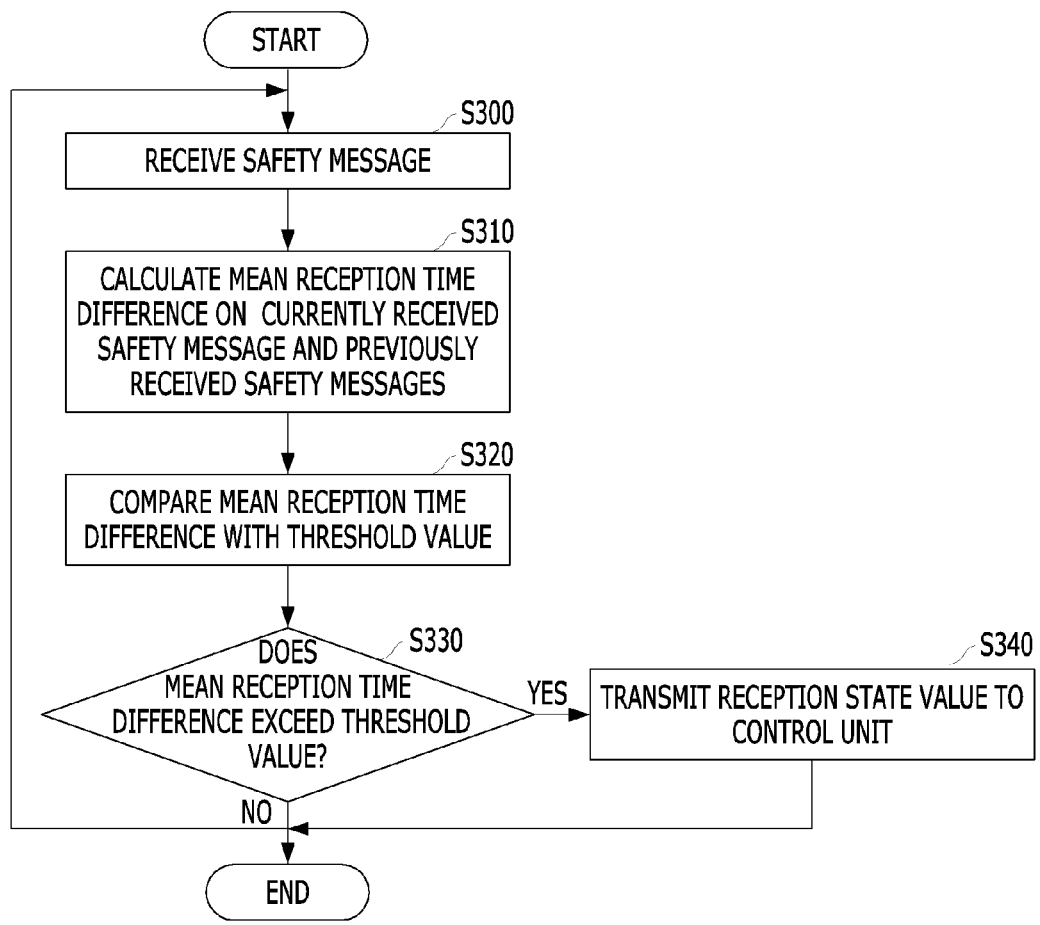
FIG. 3 is a flowchart showing an order according to operations of a reception state determination unit of the system for controlling safety message transmission between group driving vehicles according to an exemplary embodiment of the present invention.

FIG. 3 is a flowchart showing an order according to operations of a reception state determination unit of the system for controlling safety message transmission between group driving vehicles according to an exemplary embodiment of the present invention.

Meanwhile, a safety message being subject to a determination in the reception state determination unit 140 is an emergency safety message, which is a safety message determined to be an emergency safety message in the message type determination unit 130.

According to an exemplary embodiment of the present invention, the reception state determination unit 140 receives a safety message being transmitted from the message type determination unit 130 (S300), calculates a mean reception time difference (S310), and compares the mean reception time difference with a threshold value (S320), thereby determining a reception state of the safety message.

In this case, when Ts(n) represents a time at which a current safety message (n) is received, and Ts(n−1), Ts(n−2) and Ts(n−3) represent times at which three previous safety messages are received, respectively, a difference D(n) between time Ts(n) and time Ts(n−1) of the latest two safety messages is described as Equation 1 below, and a difference D(n−1) between time Ts(n−2) and time Ts(n−3) of the preceding two safety messages is described as Equation 2 below.

A mean reception time difference M(n) of the safety messages is obtained according to Equation 3. Although Equation 3 is provided to calculate a mean reception time difference of four safety messages, the number of safety messages used to calculate a mean reception time difference may be equal or greater than 4.

$$D(n) = Ts(n) - Ts(n-1) \qquad \text{[Equation 1]}$$

$$D(n-1) = Ts(n-2) - Ts(n-3) \qquad \text{[Equation 2]}$$

$$M(n) = f \cdot D(n-1) + (1-f) \cdot D(n), f \text{ is a value between 0 and 1} \qquad \text{[Equation 3]}$$

Meanwhile, the reception state determination unit 140 compares the mean reception time difference M(n) with a threshold value (S320), and if the mean reception time difference M(n) exceeds the threshold value (Yes from S330), generates a reception state value based on a difference between the mean reception time difference M(n) and the threshold value, and transmits the generated reception state value to the control unit 150 (S340).

In general, safety messages are transmitted at a transmission time interval of about 100 ms, and are continuously transmitted for a preset time duration or until a preset termination time. Accordingly, the threshold value is set in consideration of a transmission time interval value and a signal processing time of safety messages.

In this case, the reception state determination unit 140 waits for the next safety message to be received if the mean reception time difference M(n) does not exceed the threshold value (No from S330), that is, the mean reception time difference M(n) is equal to or lower than the threshold voltage.

That is, according to an exemplary embodiment of the present invention, the reception state determination unit 140 determines that the reception state of the safety message is not good (the safety message determined to be not effective) if the mean reception time difference M(n) exceeds the threshold value.

In addition, the reception state determination unit 140 determines that the reception state of the safety message is good (the safety message determined to be effective) if the mean reception time difference M(n) is equal to or lower than the threshold value.

Hereinafter, a method of generating a new transmission power and a new transmission time interval for a safety message in the control unit 150 will be described in detail.

First, the control unit 150 generates a new transmission power PWR(n) based on Equation 4 below.

$$PWR(n)[dB]=\mathrm{maximum}(PWR(n-1)-\Delta P, P\mathrm{min}) \quad \text{[Equation 4]}$$

That is, the control unit 150 generates the new transmission power PWR(n) as a maximum between a value PWR(n−1)−ΔP, which is obtained by reducing a predetermined levelΔP[dB] from a previous transmission power PWR(n−1), and a minimum value Pmin within a preset range of transmission power.

If the vehicle equipped with the system 100 is a leader vehicle, Pmin is defined as Pmin(L), wherein Pmin(L) is a minimum signal power ensuring a signal quality of a general safety message of a leader vehicle.

If the vehicle equipped with the system is a follower vehicle, Pmin is defined as Pmin(F), wherein Pmin(F) is a signal power capable of transmitting a general safety message from the follower vehicle to preceding and following vehicles.

Meanwhile, the control unit 150 generates a new transmission time interval PRD(n) based on Equation 5 below.

$$PRD(n)=\mathrm{minimum}(PRD(n-1)\times\Delta R, R\mathrm{max}) \quad \text{[Equation 5]}$$

That is, the control unit 150 generates the new transmission time interval PRD(n) as a minimum between a value PRD(n−1)×ΔR, which is obtained by multiplying a previous transmission time interval PRD(n−1) by a predetermined number AR, and a maximum value Rmax within a preset range of transmission time interval.

If the vehicle equipped with the system 100 is a leader vehicle, Rmax is defined as Rmax(L), and if the vehicle equipped with the system 100 is a follower vehicle, Rmax is defined as Rmax(F). In this case, Rmax(L) and Rmax(F) each represent a maximum latency within a preset range that is allowable to a concerned safety message in a respective one of vehicles.

A construction of the system for controlling safety message transmission between group driving vehicles according to an exemplary embodiment of the present invention and operations of the respective elements of the system have been described above. Hereinafter, the overall operation of the system for controlling safety message transmission between group driving vehicles according to an exemplary embodiment of the present invention will be described.

Figure 4A:
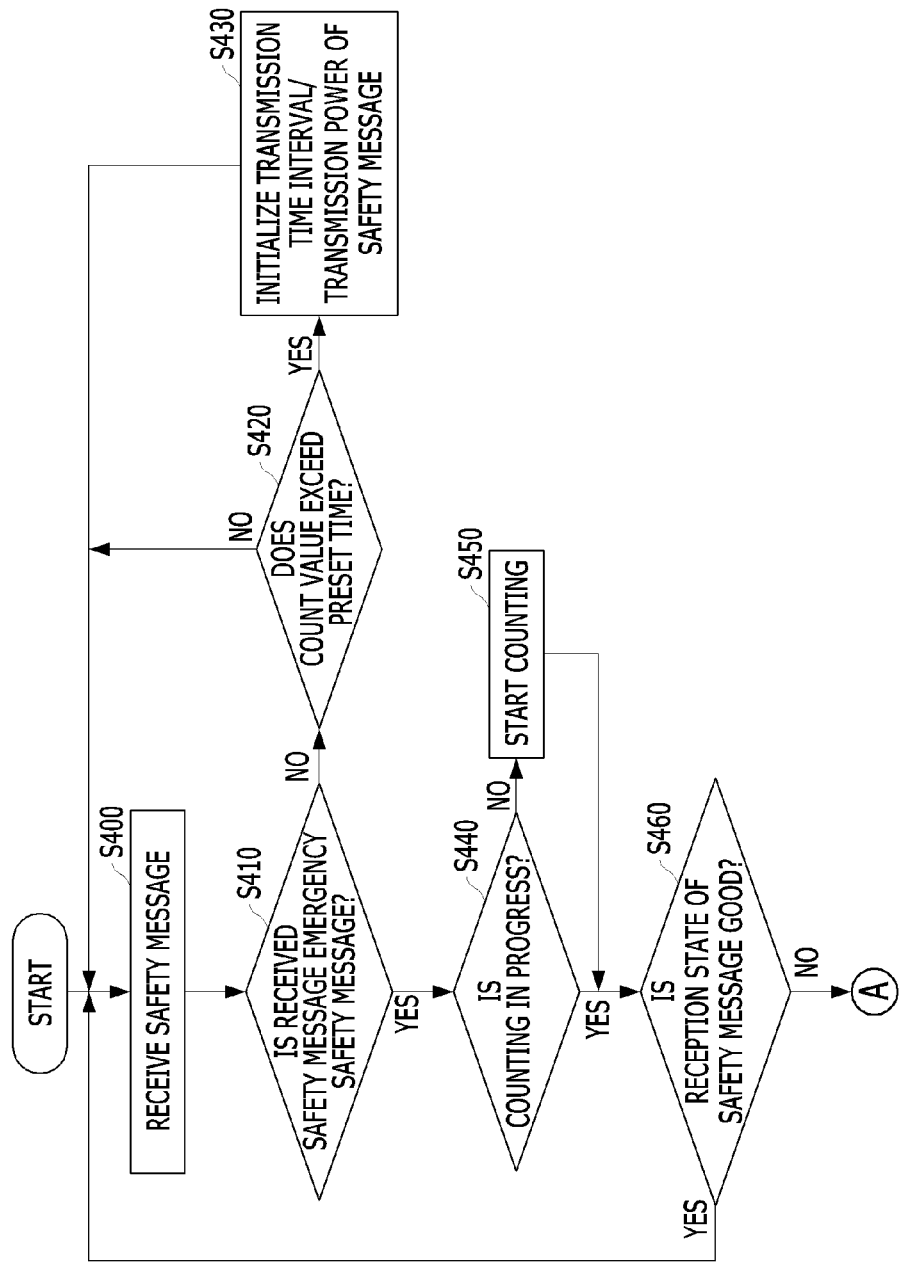

FIGS. 4A and 4B are flowcharts showing an order according to operations of the system for controlling safety message transmission between group driving vehicles according to an exemplary embodiment of the present invention.

Referring to FIGS. 4A and 4B, the system 100 for controlling safety message transmission between group driving vehicles according to an exemplary embodiment of the present invention, in the initiation stage, transmits a general safety message and receives a safety message transmitted from outside (nearby vehicles) based on a preset initial transmission time interval and a preset initial transmission power.

Upon receiving a safety message (S400), the system 100 determines whether the received safety message is a general safety message or an emergency safety message (S410).

The determination process according to S410 has been described with reference to FIG. 2 in detail, and details of the process of determining whether the safety message is a general safety message or an emergency safety message will be omitted.

Meanwhile, if the received safety message is a general safety message as a result of the determination in operation S410 (No from S410), the system 100 determines whether a current count value exceeds a preset time (S420).

If it is determined in operation S420 that the current count value does not exceeds the preset time (No from S420), the system 100 waits for the next safety message to be received, and if it is determined in operation S420 that the current count value exceeds the preset time (Yes from S420), the system 100 initializes the transmission power and the transmission time interval of the safety message (S430), and waits for the next safety message to be received.

If the received safety message is an emergency safety message as a result of the determination in operation S410 (Yes from S410), the system 100 determines whether a counting for determining whether to initialize a transmission time interval and a transmission power of the safety message is in progress (S440), and if the counting is in progress (Yes from S440), determines whether a reception state of the safety message determined to be an emergency safety message is good (S460).

On the other hand, if it is determined that the counting is not in progress as a result of the determination in operation S440 (No from S440), the system 100 starts counting (S450), and determines whether a reception state of the safety message determined to be an emergency safety message is good (S460).

If it is determined that the reception state of the safety message is good as a result of the determination in operation S460 (Yes from S460), the system 100 waits for the next safety message to be received.

On the other hand, if it is determined that the reception state of the safety message is not good as a result of the determination in operation S460 (No from S460), the system 100 generates a new transmission time interval and a new transmission power for safety message transmission (S470).

The operation according to S470 has been described above, and description thereof will be omitted.

Meanwhile, when the new transmission time interval and the new transmission power are generated according to operation S470, the system 100 transmits a safety message based on the generated new transmission time interval and new transmission power (S480).

As is apparent from the above, according to the method for controlling safety message transmission, a vehicle having received an emergency safety message transmits a general safety message based on adjusted transmission power and adjusted transmission time interval. Accordingly, the reliability and promptness of transmitting emergency safety messages can be improved, and nearby vehicles can receive an emergency safety message with a high reliability and a low latency.

Although the system and method for controlling safety message transmission between group driving vehicles according to the preferred embodiments of the present invention have been disclosed for illustrative purposes, those skilled in the art will appreciate that various modifications, additions and substitutions are possible, without departing from the scope and spirit of the invention as disclosed in the accompanying claims.

Therefore, the exemplary embodiments disclosed in the present invention and the accompanying drawings are not intended to limit but illustrate the technical spirit of the present invention, and the scope of the present invention is not limited by the exemplary embodiments and the accompanying drawings. The protection scope of the present invention shall be construed on the basis of the accompanying claims and it shall be construed that all of the technical ideas included within the scope equivalent to the claims belong thereto.

What is claimed is:

1. A system for controlling safety message transmission between group driving vehicles, the system comprising:
    a setting unit configured to set a transmission time interval and a transmission power of a safety message;
    a message type determination unit configured to analyze a safety message received, and determine whether the safety message is a general safety message or an emergency safety message;
    a reception state determination unit configured to determine a reception state of the safety message transmitted from the message type determination unit; and
    a control unit configured to generate a new transmission time interval and a new transmission power for safety message transmission based on a value of the reception state determined by the reception state determination unit, and transmit the generated new transmission time interval and new transmission power to the setting unit,
    wherein the reception state determination unit determines the reception state of the safety message transmitted from the message type determination unit by calculating a mean reception time difference based on the safety message currently received and previously received safety messages.

2. The system of claim 1, wherein the message type determination unit stores safety message type information, and determines whether the received safety message is a general safety message or an emergency safety message by comparing the received safety message with the safety message type information.

3. The system of claim 2, wherein the message type determination unit, upon determining that the received safety message is an emergency safety message, transmits the received safety message to the reception state determination unit.

4. The system of claim 2, wherein the message type determination unit, transmitting the received safety message to the reception state determination unit, determines whether a counting for initializing a transmission time interval and a transmission power of the safety message is in progress, and if the counting is not in progress, starts the counting.

5. The system of claim 2, wherein if the message type determination unit, upon determining that the received safety message is a general safety message, determining whether a count value of a counting for initializing a transmission time interval and a transmission power of a safety message exceeds a preset time, and if the count value exceeds the preset time, transmits an initialization signal to the setting unit.

6. The system of claim 1, wherein the reception state determination unit determines the reception state of the safety message transmitted from the message type determination unit, and if the reception state is determined to be not good, transmits the value of the reception state to the control unit.

7. The system of claim 6, wherein the reception state determination unit calculates the mean reception time difference based on the safety message currently received and previously received safety messages, compares the mean reception time difference with a threshold value, and if the mean reception time difference exceeds the threshold value, determines that the reception state is not good.

8. The system of claim 1, wherein the control unit generates the new transmission power as a maximum between a value obtained by reducing a predetermined level from a previous transmission power and a minimum value within a preset range of transmission power.

9. The system of claim 1, wherein the control unit generates the new transmission time interval as a minimum between a value obtained by multiplying a previous transmission time interval by a predetermined number and a maximum value within a preset range of transmission time interval.

10. The system of claim 1, further comprising a transmission unit configured to transmit the safety message, wherein the setting unit sets the transmission unit such that the transmission unit transmits the safety message based on the new transmission time interval and the new transmission power.

11. A method for controlling safety message transmission between group driving vehicles, the method comprising:
    receiving a safety message transmitted from outside;
    determining whether the received safety message is a general safety message or an emergency safety message by analyzing the received safety message;
    determining a reception state of the received safety message if it is determined that the received safety message is an emergency safety message as a result of the determining of whether the safety message is a general safety message or an emergency safety message;
    generating a new transmission time interval and a new transmission power for safety message transmission if it is determined that the reception state of the received safety message is not good as a result of the determining of the reception state; and
    transmitting a safety message based on the new transmission time interval and the new transmission power,
    wherein in the determining of the reception state of the received safety message, calculating a mean reception time difference based on the received safety message and previously received safety messages.

12. The method of claim 11, wherein in the determining of whether the safety message is a general safety message or an emergency safety message, the received safety message is compared with pre-stored safety message type information, so that the received safety message is determined to be a general safety message or an emergency safety message.

13. The method of claim 11, further comprising, if it is determined that the received safety message is an emergency safety message as a result of the determining of whether the safety message is a general safety message or an emergency safety message, determining whether a counting for initializing a transmission time interval and a transmission power of a safety message is in progress, and if the counting is not in progress, starting the counting.

14. The method of claim 11, further comprising, if it is determined that the received safety message is a general safety message as a result of the determining of whether the safety message is a general safety message or an emergency safety message, determining whether a count value of a counting for initializing a transmission time interval and a transmission power of a safety message exceeds a preset time, and if the count value exceeds the preset time, initializing the transmission time interval and the transmission power of the safety message.

15. The method of claim 11, wherein in the determining of the reception state of the received safety message, the mean reception time difference is calculated based on the received safety message and previously received safety messages, the mean reception time difference is compared with a threshold value, and if the mean reception time exceeds the threshold value, the reception state is determined to be not good.

16. The method of claim 11, wherein in the generating of the new transmission time interval and the new transmission power for safety message transmission, the new transmission power is generated as a maximum between a value obtained by reducing a predetermined level from a previous transmission power and a minimum value within a preset range of transmission power.

17. The method of claim 11, wherein in the generating of the new transmission time interval and the new transmission power for safety message transmission, the new transmission time interval is generated as a minimum between a value obtained by multiplying a previous transmission time interval by a predetermined number and a maximum value within a preset range of transmission time interval.

* * * * *